Figure 9:
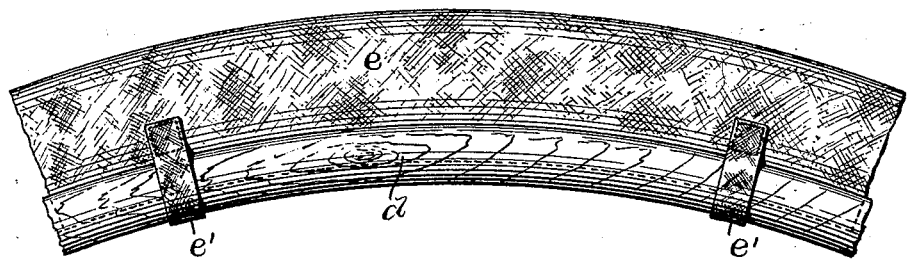

No. 645,310. Patented Mar. 13, 1900.
W. CORLISS.
WHEEL TIRE.
(Application filed Mar. 16, 1899.)
(No Model.) 2 Sheets—Sheet 1.
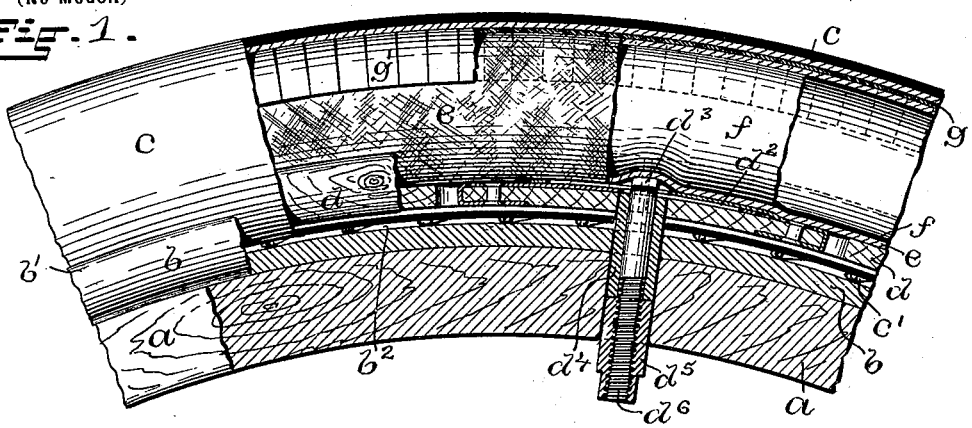
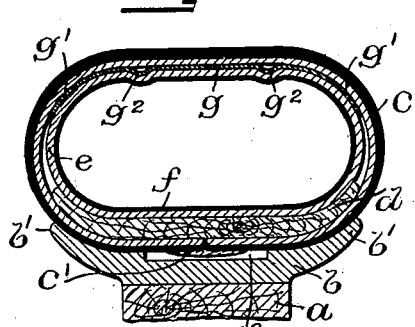
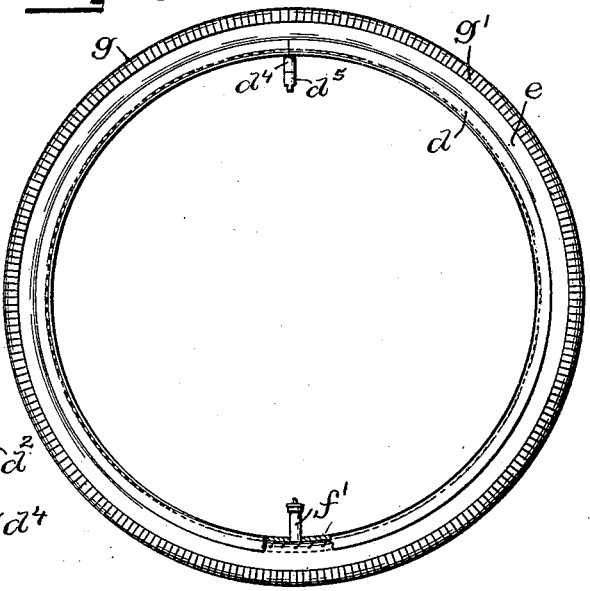
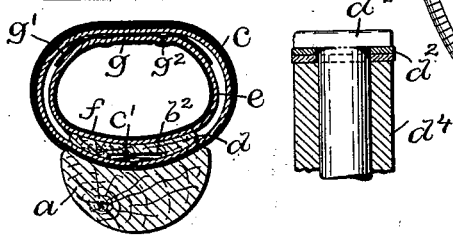
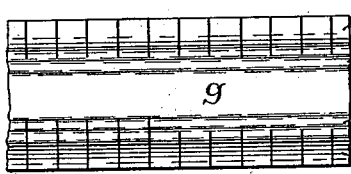 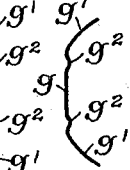 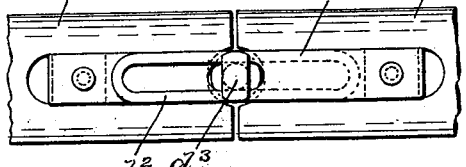
WITNESSES: INVENTOR:
B. M. Simms William Corliss
Chas. H. Luther Jr. by Joseph A. Miller & Co.
 Attys.
THE NORRIS PETERS CO., PHOTO-LITHO., WASHINGTON, D. C.

No. 645,310. Patented Mar. 13, 1900.
W. CORLISS.
WHEEL TIRE.
(Application filed Mar. 16, 1899.)
(No Model.) 2 Sheets—Sheet 2.

WITNESSES:
B. M. Simms
Chas. H. Luther Jr.

INVENTOR:
William Corliss
by Joseph A. Miller & Co
Attys.

THE NORRIS PETERS CO., PHOTO-LITHO., WASHINGTON, D. C.

UNITED STATES PATENT OFFICE.

WILLIAM CORLISS, OF PROVIDENCE, RHODE ISLAND.

WHEEL-TIRE.

SPECIFICATION forming part of Letters Patent No. 645,310, dated March 13, 1900.

Application filed March 16, 1899. Serial No. 709,277. (No model.)

*To all whom it may concern:*

Be it known that I, WILLIAM CORLISS, of Providence, in the county of Providence and State of Rhode Island, have invented a new and useful Improvement in Wheel-Tires; and I hereby declare that the following is a full, clear, and exact description of the same, reference being had to the accompanying drawings, forming part of this specification.

This invention has reference to an improvement in pneumatic wheel-tires especially designed for use on vehicles where a heavy load is to be supported and also adapted for use on bicycles or tricycles.

Pneumatic tires as heretofore constructed may be, broadly, divided into two classes, the first of which is the single-tube or hose-pipe tire, in which the tube is made of textile material impregnated and covered with rubber. This tube is practically non-expansible, sufficiently strong to withstand great internal pressure, and of sufficient thickness to resist for a considerable time the wear and tear of use. The second class of pneumatic tires consists in a non-expansible outer cover secured to the rim of the wheel containing an expansible air-tube, which when filled with air under pressure expands and bearing on the inner side of the cover maintains the cover in its expanded form under the desired pressure. Both of these two classes of pneumatic tires have been provided with armor to protect the tires against puncturing or cutting.

When the wheels of a vehicle roll on the ground, the pneumatic tire at the point of contact with the ground is compressed, and as the wheel rolls on this compression moves forward on the tire, while the resiliency of the compressed air in the tire restores the tire to its normal condition. In the single-tube tire the construction of the tube by which strength and durability are secured resists to some extent the depression of the tube by the load in front and the quick return of the tube to its normal tubular condition in the rear, and in the second class of tires the material of the cover affects the quick life action of the tire.

One object of this invention is to produce a tire in which the load is supported on a flexible non-elastic tube which is protected against wear and injury.

Another object of the invention is to support the wheel and load on a flattened pneumatic tube resting on an extended base, whereby the lateral swaying of the vehicle is avoided; and a further object of the invention is to construct a wheel-tire in which a lower air-pressure may sustain a greater load and a more sightly tire is secured.

The invention consists in the peculiar and novel construction and the combination of the parts whereby a transversely-flattened pneumatic tire is secured to the wheel, as will be more fully set forth hereinafter.

Figure 10:
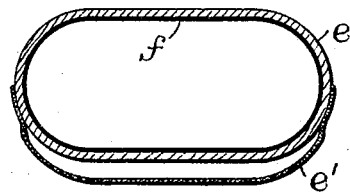
Figure 11:
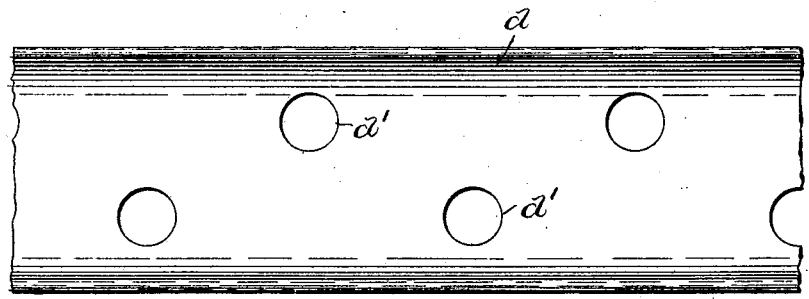

Figure 1 is a side view, partly in section, of a pneumatic tire for carriage-wheels or the wheels of similar vehicles. Fig. 2 is a transverse sectional view of the same, showing the supporting rim and bolster. Fig. 3 is a side view of my improved pneumatic tire shown with the cover removed. Fig. 4 is a transverse sectional view of the tire illustrating its application to a bicycle-rim. Fig. 5 is a view, partly in section, of the bolt used to secure the bolster. Fig. 6 is a top view, and Fig. 7 a sectional view, of the armor-hoop by which the outward expansion of the tire is limited and the flattened cross-section of the pneumatic tire maintained. Fig. 8 is a top view of the splice by which the ends of the bolster are secured. Fig. 9 is a side view of the pneumatic tube and bolster, showing the loops by which the tube is secured to the bolster and held against creeping. Fig. 10 is a transverse sectional view of the pneumatic tube and the loops. Fig. 11 is a top view of the bolster, showing the holes in the same.

Similar marks of reference indicate corresponding parts in all the figures.

In the drawings, $a$ indicates the felly of the ordinary carriage or other vehicle wheel and $b$ the metal rim, taking the place of the tire heretofore used on such wheels to secure a firm support for the flattened pneumatic tire. The rim $b$ is provided on each side with the upwardly-curved flanges $b'\ b'$ and is also provided with the central groove $b^2$ for the reception of the lacings $c'$, by which the edges of the flexible non-elastic cover $c$ are secured together. $d$ is a bolster forming an expansible ring, the ends of which abut or nearly abut when in the operative position, but may be drawn apart to expand the bolster when the tire is to be removed from or passed over the upper edges of the curved flanges $b'\ b'$ of the rim. The bolster $d$ bridges the groove $b^2$ in the rim $b$ and has its opposite sides curved upward, so as to bear on the flanges $b'\ b'$ and give a firm support to practically the whole width of the flexible non-elastic pneumatic tube $e$, made of woven or braided fabric. This tube $e$ is not covered or impregnated with rubber or other material. It is made as light and flexible as possible. The light rubber film tube $f$ is placed into the textile tube $e$ and is connected with the valve-tube $f'$, through which air under pressure is forced into the tube $f$, and the same, as also the textile tube $e$, is sustained under the desired air-pressure. The steel hoop $g$, forming a continuous ring of spring-steel, is separated along the margins $g'\ g'$ by cuts into a series of small flexible plates which readily yield to any changes in the textile tube $e$ and protect the tube against punctures. The central portion of the steel hoop $g$ is flat, but along the margins the shallow grooves $g^2\ g^2$ are formed to prevent any lateral sliding of the steel hoop $g$ on the textile tube $e$. For light vehicles the cuts separating the margins $g'$ into a series of individual spring-plates may extend across the shallow grooves $g^2\ g^2$, as is indicated at the lower left-hand corner of Fig. 6.

The cover $c$ is formed of flexible non-elastic material and is preferably impregnated or covered with rubber or similar elastic material. The transversely-flattened textile tube $e$, resting on the bolster $d$ and maintained in the flattened condition by the steel hoop $g$, forms the support of the wheel and load, and owing to the flattened central portion a large supporting area for the air-pressure to act upon is presented, so that with a comparatively-low air-pressure a heavy load may be sustained, and as the flexible textile tube $e$ is supported on the bolster practically the whole width and also for the greater part of the width on the ground the lateral swaying and uneasy motion in motor or other carriages are avoided, the excessive strain on the material of the tire is greatly diminished, and the depth of the tire is materially reduced as well as the extent of the vertical motion of the wheel, while a durable, noiseless, elastic, and sightly tire is secured, avoiding the clumsy appearance as heretofore constructed.

Pneumatic tires have a tendency to creep on the rims and are usually cemented to the rims to prevent creeping. As I consider it desirable to preserve the flexibility and free action of the textile tube $e$, I provide the same with a number of the loops $e'\ e'$, the ends of which are firmly secured to the textile tube $e$. The loops extending under the bolster $d$ are firmly held between the curved outer margins of the bolster $d$ and the cover $c$, the cover $c$ being also firmly secured by being clamped between the upwardly-curved flanges $b'\ b'$ of the rim $b$ and the superimposed curved margins of the bolster.

In the preferred form I provide the bolster $d$ with a number of holes $d'\ d'$, as is shown in Fig. 11, so that the air-pressure in the textile tube $e$ will force portions of the wall of the textile tube into these holes, and thereby materially resist the tendency of the tube to creep on the bolster. This bolster, forming an open ring, is provided at the ends with the slotted plates $d^2\ d^2$, and when the tire is inflated and ready for use the T-bolt $d^3$, extending through the tube $d^4$, is secured by screwing the internally-screw-threaded tube $d^5$ onto the screw-threaded end $d^6$ of the T-bolt, thus drawing the head onto the slotted plates $d^2\ d^2$ and securing the bolster in its contracted position, as is shown in Figs. 5 and 8. By this construction the flexibility and movement of the pneumatic textile tube $e$ under a load are neither limited nor impeded by the cover $c$. The textile tube is not concentric with the cover, and when the tire is compressed by the load the cover moves outwardly away from the sides of the textile tube, thus leaving the textile tube and the air contained in it free to act and react, thereby securing the quick resilient action of the pneumatic textile tube and an easy-riding elastic tire.

Having thus described my invention, I claim as new and desire to secure by Letters Patent—

1. In a wheel-tire, the combination with the fellies of the wheel, a metal rim having flanges extending on each side beyond the fellies, a flexible, non-elastic cover, an expansible bolster bearing on the cover and supported on the outwardly-extending flanges of the metal rim, a flexible, textile, non-expansible tube, an air-tube, and a spring-steel hoop interposed between the cover and the textile tube; whereby the pneumatic textile tube of flattened cross-section is supported by the rim and bolster, as described.

2. In a wheel-tire, the combination of the following instrumentalities: a flexible, non-expansible textile tube, an elastic air-tube in the non-expansible tube, a steel hoop encircling the textile tube to hold it in the flattened condition, and an expansible bolster forming the support across the width of the flattened textile tube; the whole adapted to form the pneumatic support of the wheel and load, as described.

3. In a wheel-tire, in combination, a flexible, non-expansible tube, an air-tube and connections for inflating the same, a steel hoop having the margins divided into plates by transverse cuts the central portion acting to hold the tube in the flattened condition, a bolster forming the support of the flattened, pneumatic tube across, practically, its width, a metallic rim having flanges extending on each side beyond the fellies, and a flexible cover inclosing the pneumatic tube and secured between the flanges of the rim and the bolster; whereby a pneumatic tire having a broad tread is supported along its opposite sides on the rim and the lateral swaying of the vehicle is avoided, as described.

4. In a wheel-tire, in combination, a flexible, non-elastic tube, an expansible air-tube within the same, a spring-steel hoop surrounding the non-expansible tube, plates formed by transverse cuts made into the margins of the spring-steel hoop, inwardly-projecting, longitudinal grooves in the central portion of the spring-steel hoop, and an expansible bolster forming a support of practically the whole width of the flattened, non-expansible air-tube; the whole adapted to form the pneumatic support of the tire and protection against puncturing of the air-tube, as described.

5. In a wheel-tire, the combination with the flexible, non-expansible tube, the expansible air-tube, the steel hoop having the margins separated into plates by transverse cuts, and the expansible bolster supporting practically the whole width of the flexible, non-expansible tube, of the fellies of the wheel, the rim, the central groove in the rim, the upwardly-curved flanges projecting on each side beyond the fellies forming the side supports of the tire, and the flexible cover secured together by lacings and to the rim by the expansible bolster; whereby the pneumatic tire is supported practically across its whole width and a lower air-pressure may be used to support a given load, as described.

6. In a pneumatic tire, the combination with the non-expansible tube and the bolster supporting the tube, of loops secured to the tube and extending around the bolster, as described.

7. In a pneumatic tire, in combination, a non-expansible tube containing an air-tube, a bolster supporting the non-expansible tube, a wheel-rim, and loops secured to the non-expansible tube and extending around the bolster; whereby the loops are secured between the bolster and the rim and the tube is held against creeping, as described.

8. In a pneumatic tire, the combination with the non-expansible tube $c$, of the bolster $d$, and the holes $d'$ $d'$ in the bolster; whereby the non-expansible tube is held against creeping, as described.

In witness whereof I have hereunto set my hand.

WILLIAM CORLISS.

Witnesses:
J. A. MILLER, Jr.,
B. M. SIMMS.